INVENTOR.
ARTHUR MILLER
BY
ATTORNEY

United States Patent Office 3,229,223
Patented Jan. 11, 1966

3,229,223
LASER MODULATION SYSTEM HAVING INTERNAL POLARIZATION VECTOR SELECTION
Arthur Miller, Penn's Neck, N.J., assignor to Radio Corporation of America, a corporation of Delaware
Filed Sept. 10, 1962, Ser. No. 222,410
7 Claims. (Cl. 331—94.5)

This invention relates to improved optical masers, or lasers. In particular, this invention relates to an improved means within the laser cavity for modulating the output signal from a laser.

The term laser is a name used to refer to a device which provides "light amplification by simulated emission of radiation." The laser device is most commonly used as a source of coherent light.

In general, a laser includes an active material that will produce stimulated emission of radiation, an excitation source that pumps power into the active material, and a resonant structure or cavity.

The active material of a laser has at least two energy levels, or atomic states, seprated in energy by an amount corresponding to a characteristic output frequency. The active material is characterized by the properties that (1) its atomic particles may be excited into the higher of the two energy levels and thus an inverted population condition may be produced, and (2) when the atomic particles return to the lower energy level the active material emits light. The emitted light is such that, within the active material, an incident photon triggers an ion to emit a photon in phase with the incident photon. Thus, substantially all of the emitted light is substantially in phase and is described as coherent light. The active material may be, a solid (for example, ruby), a gas (for example, helium-neon) or a liquid.

The excitation source that is used to excite the ions into the higher energy level is referred to as a pumping source and may comprise an RF field; a light source, e.g. a xenon flash tube; or other known types of energy sources.

The resonant structure, or resonant cavity, usually includes two light reflective surfaces, such as mirrors positioned at the ends of the active material. One of the light reflective surfaces normally has a portion which is partially transparent so that an output light may be obtained from the laser. The light reflective surfaces, or mirrors, are precisely oriented so that resonant modes will exist between the mirrors at frequencies for which the spacing between mirrors corresponds to a path length of an integral number of half wavelengths.

A more detailed description of laser structures, operation and theory is given by Vogel et al. in Electronics Oct. 27, 1961, pages 40 to 47 and by Boyd et al. in Physical Review Letters 8, Apr. 1, 1962, pages 269 to 272.

A laser may be designed for communicating information by arranging to modulate the output light with the signal information by some means. As an example, if the output light is modulated in phase, frequency or amplitude, information may be transmitted as a modulated laser beam from one location to another.

Also, it is desirable to control the amount of of feedback in the resonant cavity. Thus, if the resonant cavity of a laser has substantially total internal reflection, the build up of the oscillating coherent light wave, within the resonant cavity, is more efficient and the oscillations can thus be produced with less input pumping power.

It is an object of this invention to provide an improved laser.

It is another object of this invention to provide a novel laser structure characterized in its features of controlled feedback and improved signal modulation.

These and other objects are accomplished in accordance with this invention by providing a laser device having one or more non-absorptive type light polarizers and a controllable electro-optic, or magneto-optic, unit within the resonant body or cavity of the laser. The presence of the polarizer selects that prticulaar mode of opertion for which the light is linerly polrized, with a constant direction of polarization, throughout the cross-section of the laser. By signal modulating the electro-optic unit, the polriztion of light passing through the electro-optic, or magneto-optic, unit will be changed. Light having the changed polarization will be diverted, by the light polarizer, to form output signals from the laser device.

The invention will be described in greater detil by reference to the accompanying drawings wherein.

Figure 1:
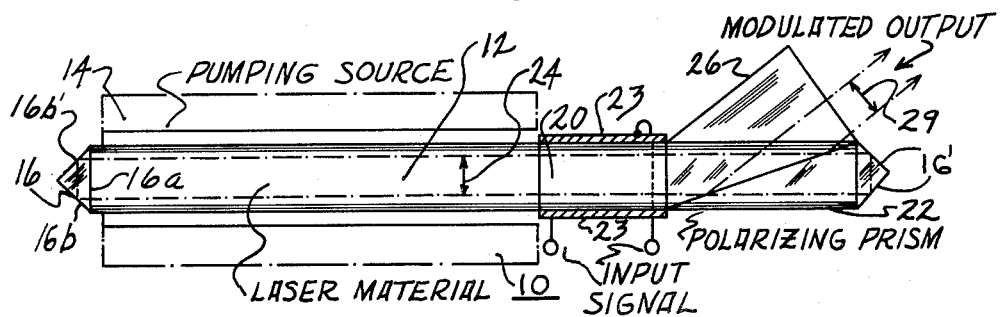
FIG. 1 is an elevtional view of a laser embodying the invention and producing coherent radiation with controlled modulation.

Referring now to FIG. 1 there is shown an apparatus 10, for producing coherent radiation, i.e., a laser. The laser 10 generally comprises an active material 12, a pumping source 14, and a pair of optical reflecting surfaces. The optical reflecting surfaces form the ends of a resonant body or cavity. Positioned within the resonant cavity is an electro-optic member 20 and a polarizing prism 22.

The active material 12 may comprise any known substance which has at lest two atomic states or energy levels separated by an amount corresponding to the output frequency desired. The active material 12 has the property of being excitable into an inverted population density condition, i.e. an excess population in the upper of the two energy states. The active material 12 emits coherent light as the atomic particles return from the higher energy level to the lower energy level. The active material may comprise a solid, e.g. a ruby crystal; a liquid; or a gas, e.g. a helium-neon gas mixture.

The pumping source 14 may comprise any source of energy which is capable of exciting the molecules or ions in the active material 12 from a lower energy level into the higher energy level. In other words, the pumping source 14 is a source of energy which is capable of establishing the inverted population density condition in the active material 12. Examples of such pumping sources are means for providing a radio frequency field, a xenon flash tube or other suitable known type of energy source.

The active material is positioned in a resonant cavity. The ends of the resonant cavity are formed by two light reflecting devices 16 and 16'. In contact with one end of the active material 12 is a light reflecting prism 16 which may be made of a material such as strain-free optical glass. The prism 16 has a polished optically flat surface 16a positioned in physical contact with the active element 12 and two surfaces 16b and 16b' at 45° angles to the surface 16a and 90° angles to each other. The other light reflecting prism 16' is positioned in physical contact with a polarizing prism 22 to be described.

In the alternative, the light reflecting means may comprise coatings, of a high light reflecting material such as silver. Also, a light reflecting coating may be used to form one end of the cavity, and a light reflecting prism used at the other end thereof. The ends of the resonant cavity are precisely oriented so that resonant modes will exist between the light reflective surfaces at frequencies for which the spacing therebetween corresponds to a path of an integral number of half wavelengths.

In optical contact with the other end of the active material 12 is an electro-optic unit 20. The electro-optic unit 20 is made of any material which has the property of varying its refractive properties, e.g. by varying the polarization of light passing therethrough, in response to an electric field or in response to a magnetic field. The electro-optic element 20 may comprise a solid, e.g. a crystal of potassium dihydrogen phosphate or a crystal of amonium dihydrogen phosphate; or a liquid, e.g. nitrobenzene.

The electro-optic element or unit 20 has the property of varying the state of the polarization of the light that is passed by the unit 20 in response to the application of an electric or a magnetic field across the unit 20. Specifically, the electro-optic unit 20 produces a component of light at 90° with respect to the original direction of polarization. Thus, for example, if approximately 9,000 volts are applied to a crystal, of approximately 1 cm. thickness, of potassium dihydrogen phosphate, the light passed by the crystal 20 will rotate from a substantially vertical plane to a substantially horizontal plane. Smaller angles of rotation will be provided by smaller voltages in a substantially linear relationship.

A specific example of an electro-optic unit 20 is a crystal of potassium dihydrogen phosphate having a dimension of approximately one-half inch thickness along the optical axis of the laser device. Electrical signal energy may be applied to the electro-optic unit by means of a pair of electrodes 23 which may be made of any conductive material.

Figure 3:
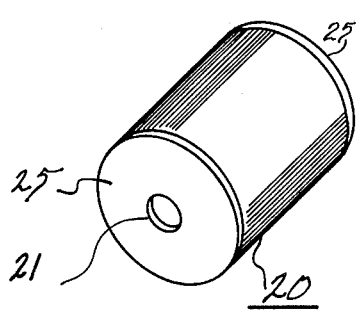
FIG. 3 is a perspective view of a modification of an electro-optic unit which may be used in the embodiments of this invention shown in FIGS. 1 and 2; and, FIG. 4 is an elevational view of another modification of an electro-optic unit for use with this invention.

Other means for applying the signal energy may also be used as long as they are controlled by the desired modulating signal. For example, using the Pockel's effect, in FIG. 3, a pair of electrodes 25 are positioned between the active material 12 and the polarizing prism 22. The electrodes 25 may be made of evaporated gold rings having centrally positioned apertures 21 on each end thereof so that the laser light may pass therethrough.

Figure 4:
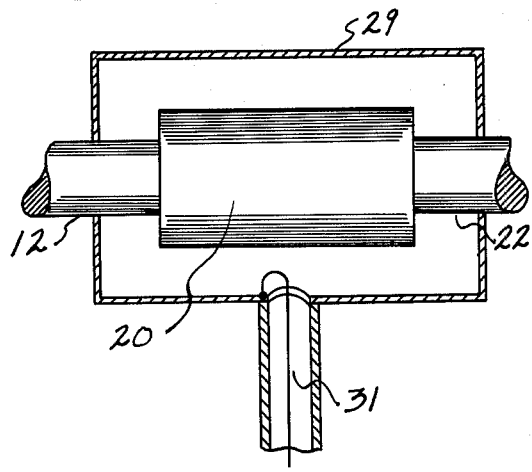

Still further, electrical fields may be applied to the electro-optic unit by positioning the unit in a wave guide or resonant cavity 29 as illustrated in FIG. 4. In such a structure, the resonant cavity 29 is modulated with the signal information fed into the coaxial input 31.

When it is desired to use the magneto-optic effect, the unit 20 may be made of gallium phosphide, and a modulated magnetic field applied.

Referring again to FIG. 1, there is positioned in optical contact, between the electro-optic unit 20 and the light reflecting surface 16', an optical polarizing prism 22 of the non-absorptive type. The polarizing prism 22 insures that all the light oscillating between the light reflective members 16 and 16', i.e. all of the light within the laser cavity, is polarized in a predetermined manner. The light oscillating in the laser cavity is polarized, and the polarizing prism 22 selects one particular mode of operation, for which the oscillating light is linearly polarized with a constant direction of polarization throughout the cross-section of the laser 10. The polarizing prism 22, may be, for example a Glan-Thompson prism and may be made of a material such as calcite. Polarizing prisms are described in detail in Fundamentals of Optics by Jenkins and White published by McGraw-Hill in 1950, pages 496 to 502.

The polarizing prism 22 is selected and oriented so that the light passed by the prism 22 has substantially the same polarization as the light normally produced in the active body 12. The reason for this is that the light produced in the active body 12 is inherently substantially polarized in a predetermined manner, for example, the active body may produce a plane polarized light. Thus, the polarizing prism is selected and oriented so as to transmit undeflected light of this predetermined polarization, and reject light of any other polarization.

During operation of the device shown in FIG. 1 the pumping source 14 supplies sufficient energy to overpopulate the upper of the two atomic states of the active material 12. From this upper energy state some atoms will decay spontaneously to the lower or ground energy state and thereby emit light. Due to the presence of the resonant cavity, the emitted light will excite one of the resonant modes of the cavity which will induce further coherent emission within the cavity. Thus, there is developed within the resonant cavity a coherent electromagnetic wave of light, illustrated by lines 24. The light produced in the resonant cavity is substantially a polarized light. Because of the presence of the polarizing prism 22 the light produced within the cavity is substantially completely polarized light. Because the ends of the cavity, i.e. reflecting surfaces 16b and 16'b, are completely reflecting, or as much so as is physically possible, i.e. the feedback is at a maximum, the resonant wave of electro-magnetic radiation is quickly developed with a minimum of power required from the pumping source 14.

The electro-optic unit 20 is selected so that the polarized light, within the resonant cavity, is passed with little or no attenuation when the electro-optic unit is not energized by an incoming signal.

When the electro-optic unit is partially energized, the polarization of the light passing through the electro-optic unit 20 is changed. Any change in the polarization of the light within the cavity will cause the component of orthogonal polarized light to that passed by prism 22 to be rejected by the polarizing prism 22. Thus light which is reoriented by the electro-optic unit 20 is rejected by the polarizing prism 22. The internal reflection at the side of the polarizing prism 22 is frustrated, for example by means of a prism 26, which allows the light to leave the system as the modulated output light signal 29 from the laser 10. The output light signal from prism 26 is coherent light that is modulated by the input signals to the electro-optic unit 20. Thus, by modulating the potential applied to the electro-optic unit 20 the output of the laser 10 is amplitude modulated.

It should be noted that a slight change in the polarization of the light passing through the electro-optic unit 20 will be sufficient for this repolarized light, which will be an accordingly small amount to be rejected by the polarizing prism 22. Thus, relatively small voltages, e.g. of the order of 300 volts are sufficient to modulate the output of the device 10.

As was previously explained if energy of sufficient magnitude is applied to the electro-optic unit 20, the polarization of all of the light passed by the electro-optic crystal may be completely rotated. Such a large rotation would shut off the lasing action since no feedback light would be available.

Because the modulated light beam is removed from the light resonant system, during a portion of a single traversal thereof, and at the speed of light, the modulation bandwidth is not limited by the Q of the resonant cavity, as would be the case for other modulation schemes.

Figure 2:
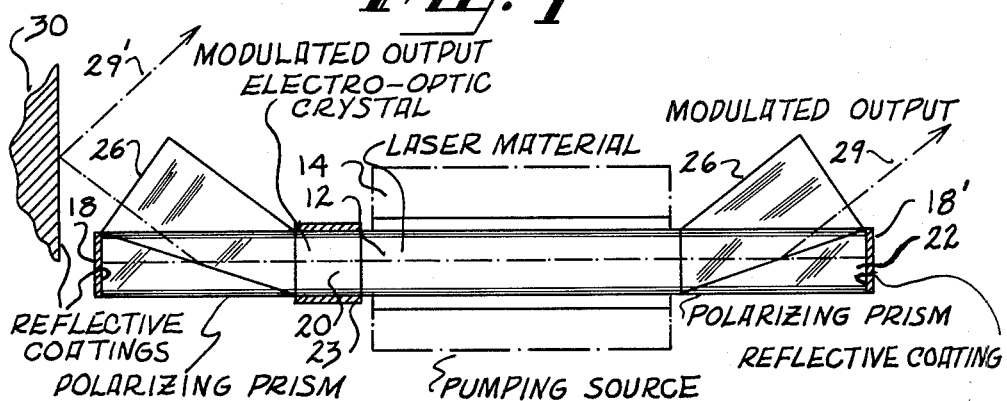
FIG. 2 is an elevational view of a second embodiment of this invention.

Referring now to FIG. 2 there is shown an embodiment of this invention which is similar to that shown in FIG. 1 except that a pair of light reflecting coatings 18 parallel to each other are used as the ends of the resonant cavity and a pair of output prisms 26 are provided. When potentials are applied to the electro-optic unit 20, the oscillating coherent light within the laser cavity is modulated as the light goes from left to right and from right to left. The purpose of the two polarizing prisms 22 and the two output prisms 26 is to effect the proper phase relationship of the modulated signals. Thus, signals may be obtained from both ends of the resonant cavity. The signals from both ends are substantially the same magnitude and may be directed into a common antenna since they are substantially the same time sequence.

Positioned adjacent to one output prism 26 is a light reflector 30. The reflector 30 should be adjusted so that both the modulation and the optical amplitudes of the two light signals 29 and 29' are in phase.

The surfaces between any two elements, i.e. an interface between two elements, e.g. the active material 12 and the electro-optic unit 20, should be polished, optically flat surfaces to prevent loss due to reflectivity. Also, the surfaces should be positioned and wrung firmly together and clamped in some vise-like structure (not shown). If desired, an anti-reflecting coating, e.g. some of the potassium halides, may be evaporated onto opposed surfaces to exactly match adjacent indices of refraction.

The flatness as required for the individual components are not as stringent as those normally used for lasers. However, flatness corrections should be made on the two extreme ends, prior to the deposition of the reflective coatings, to compensate for any undesired non-uniformities on the intermediate individual components.

What is claimed is:

1. In combination,
   (a) a resonant cavity,
   (b) an active laser material positioned within said cavity,
   (c) means positioned in said cavity for varying the polarization of light within said cavity in response to a signal supplied to said means,
   (d) a polarizing prism positioned within said cavity,
   (e) means adjacent said polarizing prism for causing light which is not transmitted by said polarizing prism to leave said cavity in the form of an output beam, and
   (f) means for supplying a modulating signal to said first-mentioned means.

2. In combination,
   (a) a resonant cavity,
   (b) an active laser material positioned within said cavity,
   (c) an electro-optic member positioned within said cavity to vary the polarization of light within said cavity in response to an applied electrical signal,
   (d) a polarizing prism positioned within said cavity,
   (e) means adjacent said polarizing prism for causing light which is not transmitted by said polarizing prism to leave said cavity in the form of an output beam, and
   (f) means for supplying an electrical modulating signal to said electro-optic member.

3. A laser comprising,
   (a) a resonant cavity,
   (b) an active laser material positioned within said cavity,
   (c) a dihydrogen phosphate crystal positioned within said cavity to vary the polarization of light within said cavity in response to an applied electrical signal,
   (d) a polarizing prism positioned within said cavity,
   (e) means adjacent said polarizing prism for causing light which is not transmitted by said polarizing prism to leave said cavity in the form of an output beam,
   (f) means for supplying an electrical modulating signal to said dihydrogen phosphate crystal, and
   (g) means for supplying excitation energy to said active laser material.

4. In combination,
   (a) a resonant cavity,
   (b) an active laser material positioned within said cavity,
   (c) means positioned in said cavity for varying the polarization of light within said cavity in response to a signal supplied to said means,
   (d) a polarizing prism positioned within said cavity, and
   (e) a prism positioned adjacent one side edge of said polarizing prism for frustrating internal reflection of the light not transmitted by said polarizing prism at the said side edge of said polarizing prism.

5. In combination,
   (a) a resonant cavity,
   (b) an active laser material positioned within said cavity,
   (c) an electro-optic crystal positioned within said cavity for varying the polarization of light within said cavity in response to an applied electrical signal,
   (d) a polarizing prism positioned within said cavity,
   (e) a prism positioned adjacent one side edge of said polarizing prism for frustrating internal reflection of the light not transmitted by said polarizing prism at the said side edge of said polarizing prism, and
   (f) means for supplying an electrical modulating signal to said electro-optic crystal.

6. A laser comprising,
   (a) a resonant cavity,
   (b) an active laser material positioned within said cavity,
   (c) an electro-optic crystal positioned within said cavity for varying the polarization of light within said cavity in response to an applied electrical signal,
   (d) two polarizing prisms positioned within said cavity, one on either side of said electro-optic crystal,
   (e) two prisms, each prism positioned adjacent one side edge of a respective polarizing prism for frustrating internal reflection of the light not transmitted by said polarizing prisms at the said edges of said polarizing prisms,
   (f) means for supplying an electrical modulating signal to said electro-optic crystal, and
   (g) means for supplying excitation energy to said active laser material.

7. A laser comprising,
   (a) a resonant cavity,
   (b) an active laser material positioned within said cavity,
   (c) an electro-optic crystal positioned within said cavity for varying the polarization of light within said cavity in response to an applied electrical signal,
   (d) two polarizing prisms positioned within said cavity, one on either side of said electro-optic crystals,
   (e) two prisms, each prism positioned adjacent one side edge of a respective polarizing prism for frustrating internal reflection of the light not transmitted by said polarizing prisms at the said edges of said polarizing prisms,
   (f) a reflector positioned adjacent one of said two prisms for reflecting a light beam emerging from said one of said two prisms so that said beam travels in a direction parallel to the light beam emerging from the other of said two prisms,
   (g) means for supplying an electrical modulating signal to said electro-optic crystal, and
   (h) means for supplying excitation energy to said active laser material.

(References on following page)

References Cited by the Examiner

FOREIGN PATENTS 1,306,777   9/1962   France.

OTHER REFERENCES

Barnes et al.: "On the Modulation of Optical Masers," Proc. of the IRE, vol. 50, No. 7, July 1962, pages 1686 and 1687.

Electronics: "Laser Modulator Uses Kerr Cell," May 25, 1962, page 70.

Gould et al.: "Self-Aligning Fabry-Perot Interferometers for use as Laser Resonators," Journal of the Optical Society of America, vol. 51, No. 12, December 1961, page 1467.

Hellwarth: "Control of Fluorescent Pulsations," Advances in Quantum Electronics, ed. by J. R. Singer, published December 1961, pages 334 to 340.

Pershan et al.: "Microwave Modulation of Light," Advances in Quantum Electronics, ed. by J. R. Singer, published Dec. 18, 1961, pages 187 to 199.

Vogel et al.: "Laser: Devices and Systems—Part III," Electronics, vol. 34, No. 45, Nov. 10, 1961, pages 83 to 85.

JEWELL H. PEDERSEN, *Primary Examiner.*